(12) United States Patent
Goldberger

(10) Patent No.: US 7,167,357 B2
(45) Date of Patent: **\*Jan. 23, 2007**

(54) SURFACE MOUNT MELF CAPACITOR

(75) Inventor: Haim Goldberger, Modi'in (IL)

(73) Assignee: Vishay Sprague, Inc., Sanford, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/259,503

(22) Filed: Oct. 26, 2005

(65) Prior Publication Data

US 2006/0104007 A1 May 18, 2006

Related U.S. Application Data

(63) Continuation of application No. 10/792,138, filed on Mar. 2, 2004.

(51) Int. Cl.
*H01G 9/00* (2006.01)

(52) U.S. Cl. ............ 361/523; 361/525; 361/528; 361/529; 361/534; 29/25.01; 29/25.03

(58) Field of Classification Search ........ 361/523–525, 361/528–532, 502–504, 508–512, 534; 29/25.03, 29/25.01
See application file for complete search history.

(56) References Cited

U.S. PATENT DOCUMENTS

| | | | |
|---|---|---|---|
| 4,984,130 A | 1/1991 | Düll et al. | |
| 5,349,496 A | 9/1994 | Taniguchi et al. | |
| 5,390,074 A * | 2/1995 | Hasegawa et al. | 361/540 |
| 6,238,444 B1 | 5/2001 | Cadwalladerm | |
| 6,380,577 B1 * | 4/2002 | Cadwallader | 257/298 |
| 6,400,556 B1 | 6/2002 | Masuda et al. | |
| 6,410,083 B1 | 6/2002 | Pozdeev-Freeman | |
| 6,430,034 B2 * | 8/2002 | Sano et al. | 361/528 |
| 6,541,302 B2 * | 4/2003 | Huber et al. | 438/106 |
| 6,679,934 B2 | 1/2004 | Rao et al. | |
| 2004/0195093 A1 | 10/2004 | Cohen et al. | |
| 2005/0195553 A1 * | 9/2005 | Goldberger | 361/300 |

* cited by examiner

*Primary Examiner*—Nguyen T. Ha
(74) *Attorney, Agent, or Firm*—McKee, Voorhees & Sease, P.L.C.

(57) ABSTRACT

The surface mount MELF capacitor of the present invention includes a wire and a conductive powder element electrically connected to the wire. The surface mount MELF capacitor has insulative material surrounding at least a portion of the conductive powder element and the wire extending from the conductive powder element. A first terminal is formed on the surface mount chip capacitor at the first end surface of the wire and a second terminal is formed by being electrically connected to the conductive powder element. The surface mount MELF capacitor of the present invention is created by methods which include the steps of providing a wire and placing conductive powder upon the wire. An embodiment of the present invention feeds the wire in a reel to reel system and electrophoretically deposits the conductive powder element upon the wire.

11 Claims, 5 Drawing Sheets

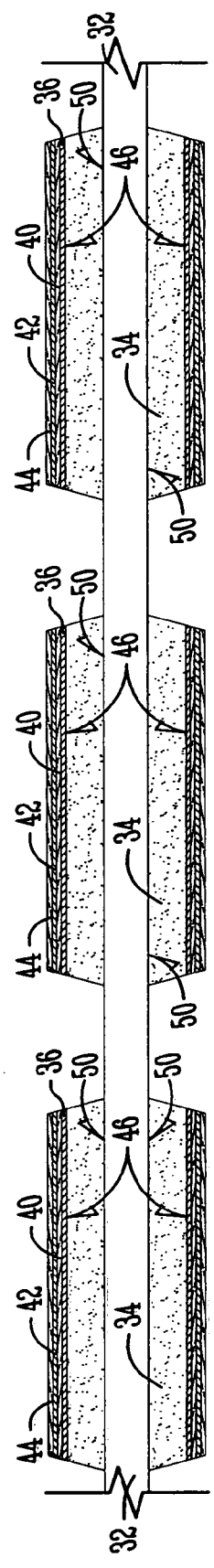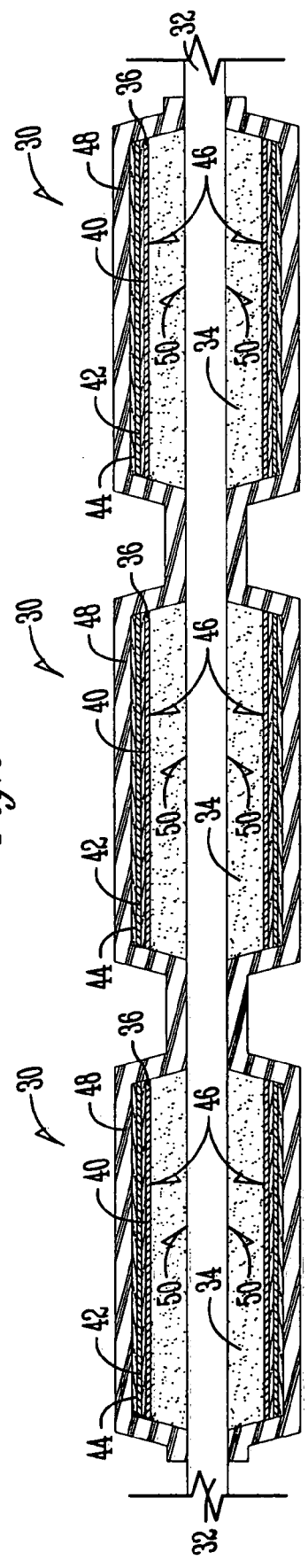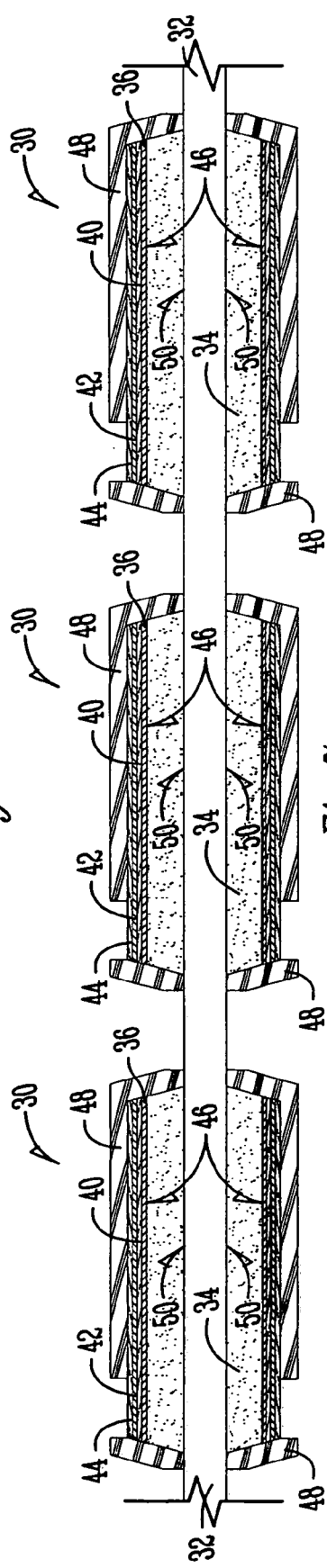

SURFACE MOUNT MELF CAPACITOR

CROSS-REFERENCE TO RELATED APPLICATIONS

This application is a continuation of U.S. application Ser. No. 10/792,138 filed Mar. 2, 2004, which is hereby incorporated by reference in its entirety.

BACKGROUND OF THE INVENTION

The present invention relates to capacitors. More particularly, though not exclusively, the present invention relates to improved surface mount MELF capacitors and methods for manufacturing the same.

BRIEF SUMMARY OF THE INVENTION

Capacitors exist in the art which are made from a capacitive element such as a tantalum slug or pellet. To create a conventional tantalum slug, tantalum powder is pressed with a binder and then exposed to a process for forming a polarized capacitor having a positive end and a negative end. A typical tantalum slug will have an anode comprised of a wire extending from the slug and a cathode comprised of a conductive surface formed at the opposite side of the tantalum slug.

The usual method for making tantalum pellets for use in tantalum capacitors includes steps wherein tantalum powder is first pressed or compacted into a pellet. The resulting pressed pellets then undergo a sintering process wherein the pellets are heated in a vacuum. The heating allows the tantalum particles to stick together so they can hold a lead wire, which functions as the anode.

Following the sintering process, the tantalum pellet is dipped in an acid solution to form a dielectric film on the outer surface of the pellet and the particles within the pellet which is typically tantalum pentoxide. The pellet and the particles within the pellet are then subsequently coated with various other metal-containing materials which form the cathode.

These capacitors have the anode and the cathode attached to a circuit board by connection wires.

Modern methods of mounting components use the possibility of soldering the components directly to conductor tracks of printed circuit boards without the use of connection wires. This technology is used to an ever increasing extent under the indication "Surface Mounted Device" (SMD).

Capacitors suitable for the SMD technique may be manufactured as a chip component and as a MELF component. Chip components generally have supporting members in the form of rectangular parallelepipeds which have end faces suitable for soldering or in the form of flipchips which have a face with both cathode and anode terminals suitable for soldering. MELF (Metal Electrode Face Bonding) components typically start from cylindrical supporting members having connection caps in which the connection wires are omitted and the caps themselves are made suitable for soldering at their surfaces by an electroplating treatment and are soldered directly with said connection caps to conductor tracks of printed circuit boards.

The great advantage of the SMD technology is that extremely high packing densities of components on the printed circuit boards are possible. For realizing ever increasing densities, smaller and smaller components suitable for the SMD technique become necessary.

However, SMD technology encounters problems with producing devices with productivity and uniformity. It can therefore be seen that there is a need for an improved surface mount MELF capacitor and method for making the same.

In addition, current SMD technology may require the manipulation of individual capacitors as opposed to using techniques for mass manipulation of capacitors. One particularly useful technique of mass manipulation is through the use of a reel to reel process. Therefore, a further feature of the present invention is the provision of a capacitor that is efficiently manufactured using a reel to reel process.

Also, current SMD technology may be improved by the use of electrophoretic deposition. Some of the advantages of electrophoretic deposition include a high coating rate of charged particles upon the substrate, a resulting film of charged particles upon the substrate that is dense and uniform, a thickness of film that is able to be controlled by depositing condition, and a simple process that is easy to scale up. Accordingly, a still further feature of the present invention is the provision of a method that uses electrophoretic deposition to increase the capacitor uniformity, tolerance, capacitance and the density per volume.

It is still a further feature of the present invention to provide a surface mount MELF that is easy to make and economical to manufacture.

The device and method of accomplishing these and other features will become apparent from the following description of the invention.

BRIEF DESCRIPTION OF THE DRAWINGS

FIGS. 2–9 are cross sectional side views of the surface mount MELF capacitor shown in FIG. 1 at various manufacturing stages.

DETAILED DESCRIPTION OF THE PREFERRED EMBODIMENT

The present invention will be described as it applies to the preferred embodiment. It is not intended that the present invention be limited to the described embodiment. It is intended that the invention cover all alternatives, modifications, and equivalencies which may be included within the spirit and scope of the invention.

Figure 10:
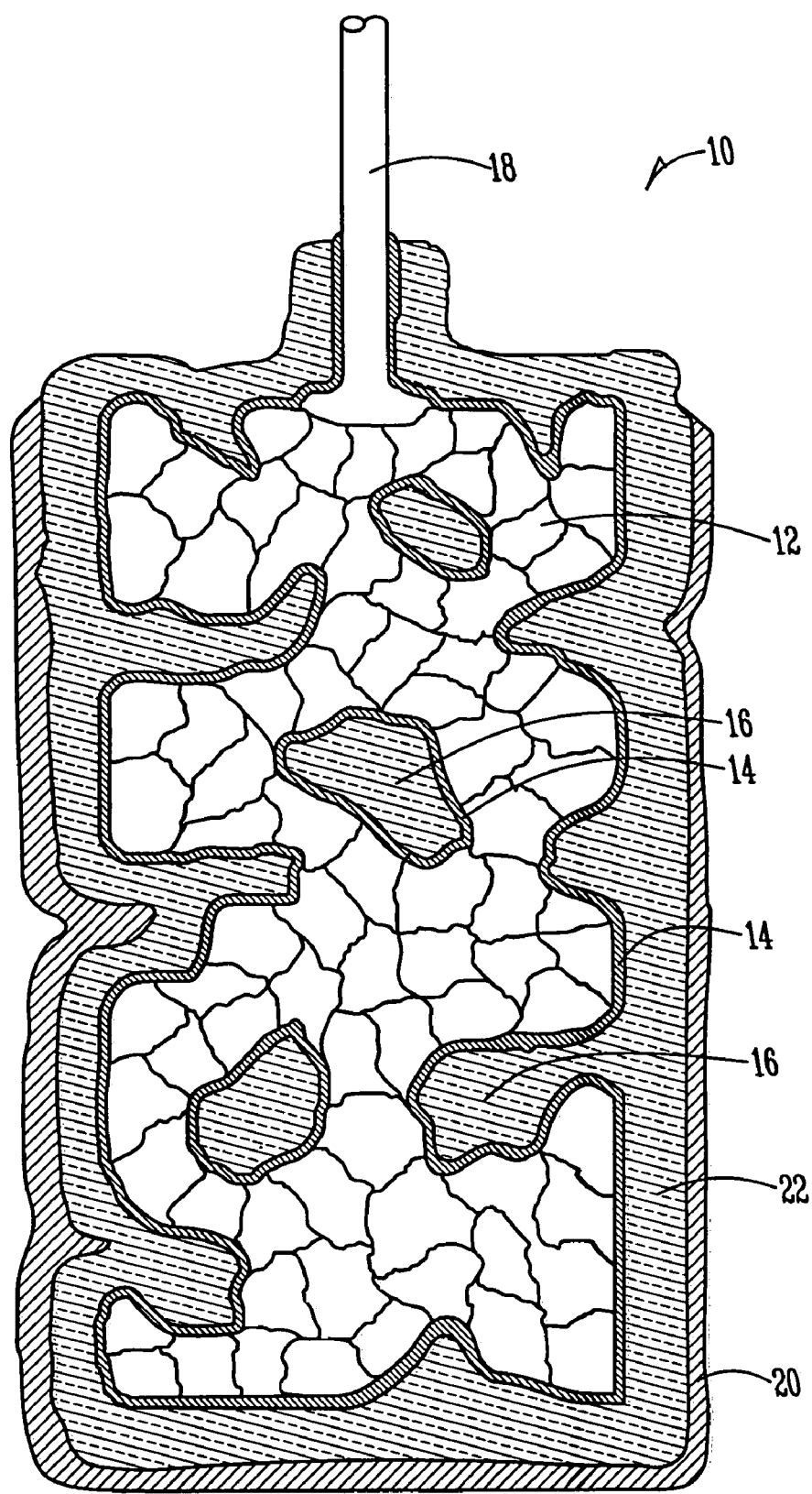
FIG. 10 is a schematic drawing of a prior art capacitor.

FIG. 10 shows a typical prior art capacitor 10. Capacitors are used in many types of electronic devices. The more popular uses for capacitors are in personal computers, disk drives, cellular phones, printers, hand held pagers, automobiles and in military equipment.

The capacitor 10, as shown, has two conductors, namely, the tantalum pellet 12 and the manganese dioxide ($MnO_2$) 16, which is actually a semiconductor. The dielectric film 14 is tantalum pentoxide ($Ta_2O_5$). When the capacitor 10 is in use, the tantalum pellet 12 is positively charged and acts as the anode, and the manganese dioxide 16 is negatively charged and acts as the cathode. The capacitor also includes a tantalum anode lead wire 18, a metallized outer electrode or silver 20 and a layer of carbon 22 inside the outer electrode 20.

The prior art capacitor 10 is usually made by taking tantalum powder and compressing or compacting into a pellet. The resulting pressed pellet 12 then undergoes a sintering process wherein the pellet 12 is heated in a vacuum. The heating allows the tantalum particles to stick together so they can hold the lead wire 18.

After the sintering process, the pellet 12 is typically dipped in an acid solution to form a dielectric film 14 on the outer surface of the pellet 12. The pellet 12 is then subsequently coated with various other metal-containing materials which form the cathode. Typically, $MnO_2$ 16 is placed around the dielectric film 14 which may be followed by the layer of carbon graphite 22 which is painted with silver print 20. Other conductive polymers such as polypirrolle can also be used in place of manganese oxide. The cathode portion ends in a cathode termination.

The lead wire 18 is usually coated with an insulating substance such as Teflon™ (not shown). The lead wire 18 is typically the anode termination. These terminations can be connected to a circuit board for mounting the capacitor 10 in an electrical circuit.

Figure 1:
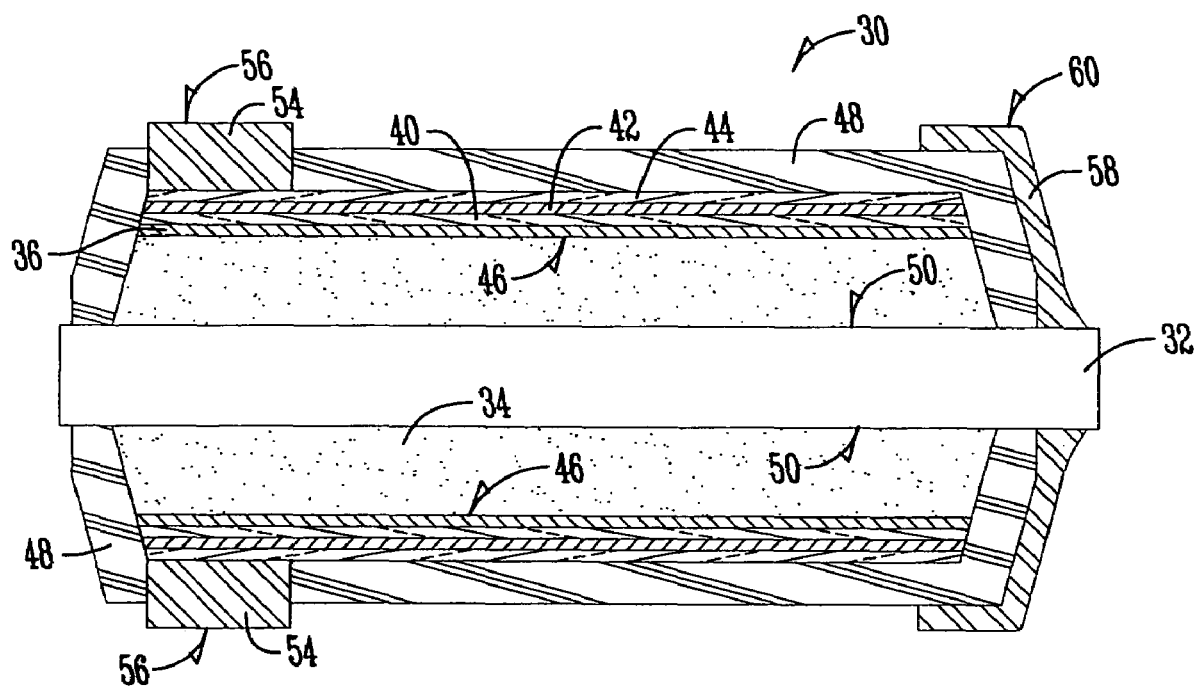
FIG. 1 is a side cross sectional view of a surface mount MELF capacitor of the present invention.

FIG. 1 shows a surface mount MELF capacitor 30 of the present invention. Note that in the figures, for clarity, the various portions of the capacitors are shown with straight and sharply cornered edges. The actual capacitors may have slightly rounded corners, etc. In addition, the capacitors have been shown in a standard shape and size; however, the shape and size may vary to include different lengths, widths, heights, size proportions of components, etc.

The capacitor 30 includes a wire 32. The wire 32 is typically made of tantalum. Alternatively, the wire may be made of another valve metal (i.e., Niobium (Nb), Hafnium (Hf), Zirconiun (Zr), Titanium (Ti), Vanadium (V), Tungsten (W), Beryllium (Be), or Aluminum (Al)). Alternatively, the wire may be made of a substrate containing a valve metal (i.e., Ta, Nb, Hf, Zr, Ti, V, W, Be, or Al). The wire is preferably between 50–100 μm thick. The wire is typically cylindrical with a circular cross section; however, the wire 32 can be in any shape and cross section.

A conductive powder element 34 is upon the wire 32. The conductive powder element may be a valve metal. Alternatively, the conductive powder element may be a valve metal substrate. The conductive powder element 34 may have a low capacitor-voltage (CV) (i.e. 10 CV) up to 100–150 KCV. The conductive powder element 34 before being placed upon the wire 32 may be in a form of a powder that is regularly agglomerated, sieved, and/or crushed. The conductive powder element 34 has a density in the range of 3–8 g/cc when attached to the wire 32 in a layer.

A dielectric film 36 is over the surface of the conductive powder element 34 and the anode wire 32. The dielectric film 36 is typically tantalum pentoxide ($Ta_2O_5$).

A solid electrolyte, i.e. manganese dioxide ($MnO_2$) or a conductive polymer is a dielectric film 40. The solid electrolyte impregnates spaces within the dielectric film 36 coated conductive powder element 34 to form the cathode of the capacitor.

A conductive counterelectrode layer overlies the manganese dioxide layer 40 and is in electrical continuity with the manganese dioxide layer 40 of the capacitor 30. The counterelectrode layer is preferably comprised of a first sublayer 42 of graphite carbon and an overlayer of metal particles 44, preferably silver, in a binder or organic resin. The counterelectrode layer extends around the cathode end 46 of the conductive powder element 34 as well as helps seal the manganese dioxide layer 40. The counterelectrode layer overlies substantially all of the side surfaces of the conductive powder element 34 to obtain a capacitor having a minimum dissipation factor and ESR, but is maintained separate from, and out of electrical continuity with the anode wire 32.

An organic coating or passivation coating 48 is formed over the counterelectrode layer on the outer perimeter of the conductive powder element 34 and over the conductive powder element 34 at each end. A cathode ring 54 is bonded in contact with the cathode end 46 of the counterelectrode layer, thus forming a cathode terminal 56. An anode end cap 58 is bonded to the wire 32 which is in contact with the anode end 50 of the conductive powder element 34, thus forming an anode terminal 60.

The cathode terminal 56 and the anode terminal 60 are connections that can be connected to a circuit board for mounting the capacitor 30 in an electrical circuit. While the method described below and shown in FIGS. 2–9 below is applied to a capacitor, it is also possible to utilize the present method for any type of chip component.

Figure 2:
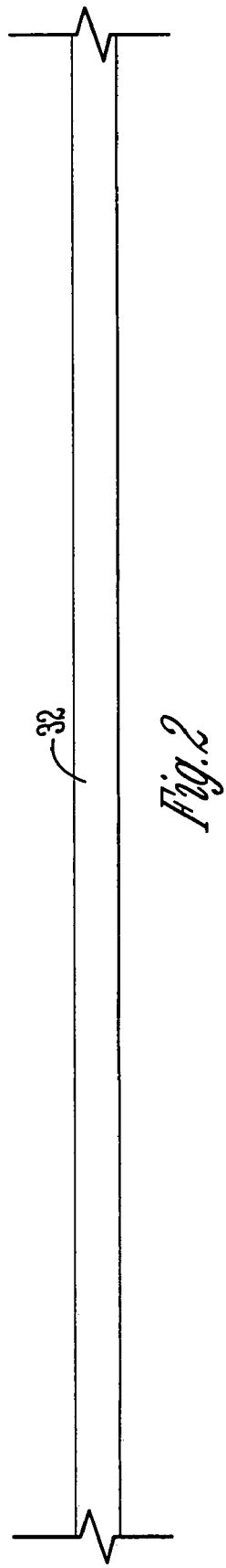

FIG. 2 is a side view of a wire 32. The wire is preferably 50–100 μm thick.

Figure 3:
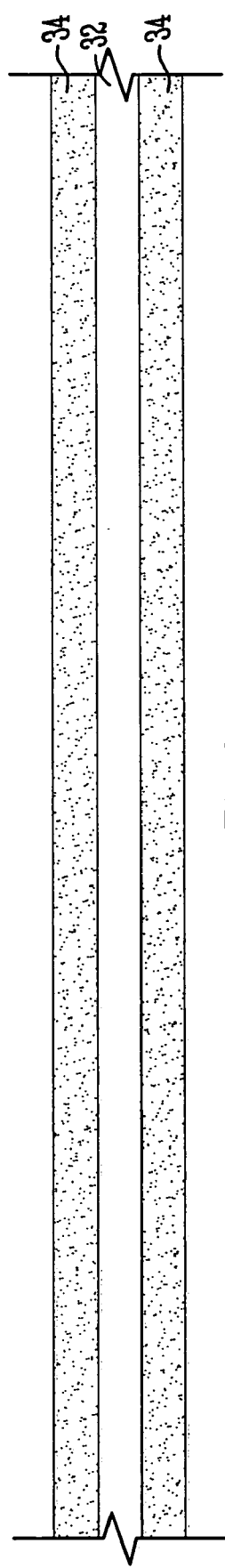

As seen in FIG. 3, the conductive powder element 34 is placed upon the wire by electrophoretic deposition that comprises essentially two steps: first, charged particles of powder (0.2–40 μm) in suspension are moved to the wire 32 by applied voltage and second, the particles of powder are deposited (discharged and flocculated) on the wire 32. The resulting film of charged particles the conductive powder element 34 which is dense and uniform.

The next step is to place the wire 32 with conductive powder element 34 through a sintering process to heat the conductive powder element 34 in a vacuum. The temperature for this process is between 600–1400° C. for tantalum and niobium. The conductive powder element 34 is held in a vacuum at the specified temperature for between about 2–20 minutes and then cooled in accordance with conventional cooling procedures that are well known in the art.

Figure 4:
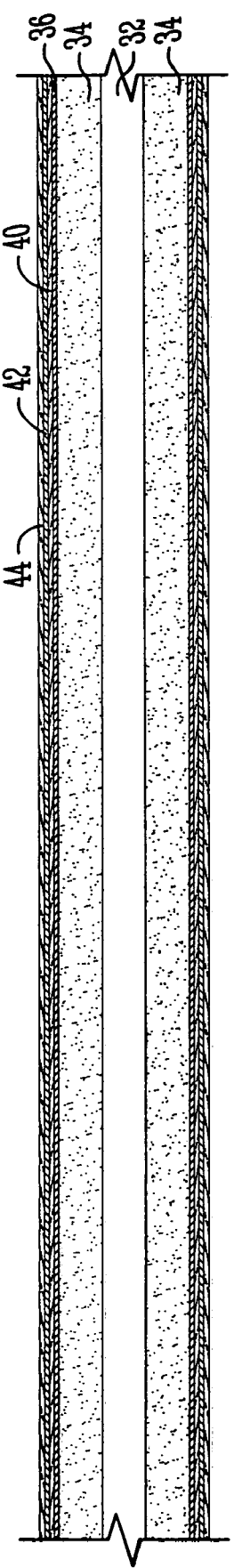
Figure 8:
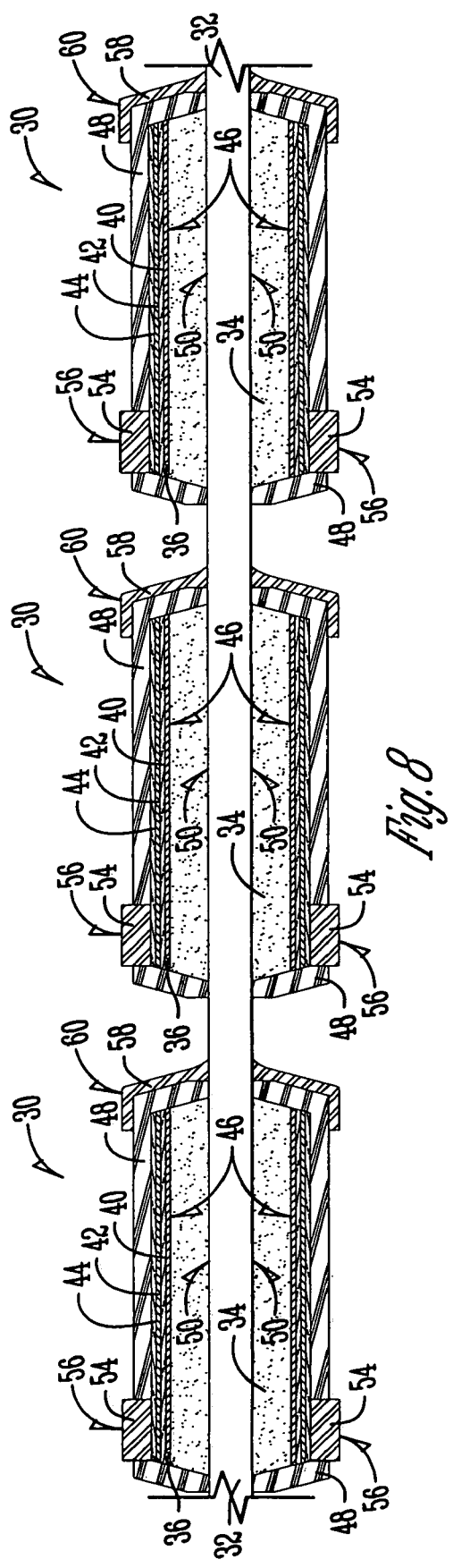
Figure 9:
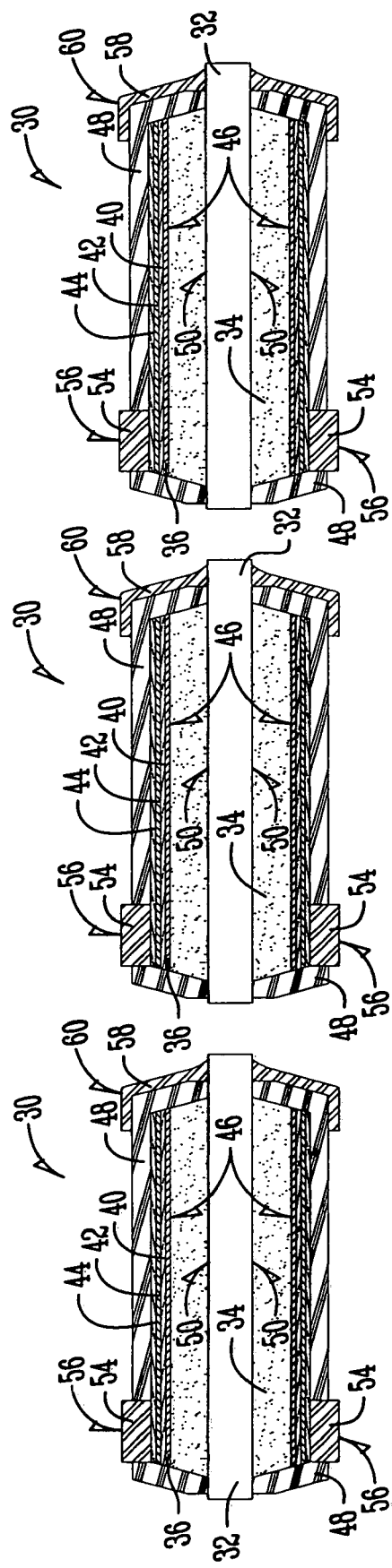

As seen in FIG. 4, after the sintering process the conductive powder element 34 is placed in an oxygen-forming solution such that a thin dielectric film 36 is formed. As an example, when using tantalum or niobium powder the thin dielectric film 36 will be tantalum pentoxide or niobium pentoxide.

Next, the cathode portion of the capacitor is formed. Typically, manganese dioxide 40 is placed around the dielectric film 36 which may be followed by a layer of carbon graphite 42 which is printed with silver 44. The silver print 44 is comprised of an organic resin heavily filled with silver flakes, making it conductive. The first sublayer 42 of graphite carbon 42 and the overlayer of metal particles are collectively called a conductive counterelectrode layer.

As seen in FIG. 6, an insulation or passivation material 46 is placed surrounding the conductive powder element 34, first and second ends and outside perimeter, and the exposed portion of the wire 32 side surfaces.

As seen in FIG. 7, the openings for the anode terminal 60 and the cathode terminal 56 are laser opened to expose the wire 32 and the conduction counterelectrode layer, respectively. While laser opening is the preferred method to expose the conductive surface of the wire 32 and counterelectode layer, other techniques could be used. Once the wire is exposed, a silver print 58, 56 can be applied as seen in FIG. 7.

The next step is to cut the surface mount MELF capacitor 30 from the series into single components. The surface mount MELF capacitor 30 may be removed from the series a number of ways well known in the art.

While the present invention can be accomplished using the methods described above, it us understood that various other methods could be used within the spirit and scope of the present invention.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A surface mount MELF capacitor comprising:
   a wire having opposite first and second ends;
   a conductive powder element electrically surrounding the wire and having opposite ends, the
      powder element being shorter than the wire so as to expose the first and second ends of the wire;
   insulative material surrounding a portion of the powder element, and covering the ends of the
      powder element, and surrounding the wire with the ends of the wire extending beyond the insulative material;
   a first terminal surrounding an insulated portion of the powder element; and
   a second terminal surrounding the second end of the wire.

2. The surface mount MELF capacitor of claim 1 wherein the first terminal is an anode and the second terminal is a cathode end.

3. The surface mount MELF capacitor of claim 1 wherein the conductive powder element is made of powder.

4. The surface mount MELF capacitor of claim 3 wherein the powder is from the group consisting of: Ta, Nb, Hf, Zr, Ti, V, W, Be, and Al.

5. The surface mount MELF capacitor of claim 3 wherein the powder is a substrate of a metal from the group consisting of: Ta, Nb, Hf, Zr, Ti, V, W, Be, and Al.

6. The surface mount MELF capacitor of claim 3 wherein the powder has been electrophoretically deposited upon the wire.

7. The surface mount MELF capacitor of claim 1 wherein the conductive powder element has a density between 3–8 g/cc.

8. The surface mount MELF capacitor of claim 1 wherein the conductive powder element has a capacitance-voltage between 10 CV and 150 KCV.

9. A series of surface mount MEILF capacitors produced using a reel to reel process, the series comprising:
   a wire having opposite first and second ends and an outer circumference; and
   a plurality of spaced apart surface mount MELF capacitors that have been formed upon the wire.

10. The series of surface mount MELF capacitors of claim 9 further comprising a cut point between each surface mount MELF capacitor.

11. The series of surface mount MELF capacitors of claim 9 wherein each surface mount MELF capacitor has:
   a conductive powder element electrophoretically deposited upon the wire and having first and second ends, the powder element being shorter than the wire so as to expose the first and second ends of exposed wire;
   an insulative layer formed around a portion of the conductive powder element, and
   around the wire with the ends of the wire extending beyond the insulative layer;
   an anode terminal surrounding an uninsulated portion of the powder element;
   a cathode terminal of surrounding the second end of the wire.

* * * * *

UNITED STATES PATENT AND TRADEMARK OFFICE
CERTIFICATE OF CORRECTION

PATENT NO.        : 7,167,357 B2
APPLICATION NO.   : 11/259503
DATED             : January 23, 2007
INVENTOR(S)       : Haim Goldberger It is certified that error appears in the above-identified patent and that said Letters Patent is hereby corrected as shown below:

Column 6, Claim 9, Line 10:
DELETE after "mount" "MEILF"
ADD after "mount" --MELF--

Column 6, Claim 11, Line 31:
DELETE after "terminal" "of"

Signed and Sealed this

Tenth Day of April, 2007

JON W. DUDAS
*Director of the United States Patent and Trademark Office*